United States Patent

[11] 3,603,186

| [72] | Inventors | Charles W. Vigor<br>Rochester;<br>Joseph A. Musial, Dearborn, both of, Mich. |
|---|---|---|
| [21] | Appl. No. | 880,869 |
| [22] | Filed | Nov. 28, 1969 |
| [45] | Patented | Sept. 7, 1971 |
| [73] | Assignee | General Motors Corp.<br>Detroit, Mich. |

[54] PEELING MACHINE TOOL CLAMP
4 Claims, 8 Drawing Figs.

[52] U.S. Cl. .................................................. 82/46,
29/96, 29/105, 82/36, 144/212
[51] Int. Cl. ......................................................... B23b 5/14,
B26d 1/00, B27i 5/00
[50] Field of Search ............................................ 82/46, 101,
1, 36; 144/212; 29/96, 105

[56] References Cited
UNITED STATES PATENTS

| 3,271,808 | 9/1966 | Bedard | 144/212 X |
| 3,395,440 | 8/1968 | Petrosky | 82/46 |

FOREIGN PATENTS

| 649,468 | 1/1951 | Great Britain | 144/212 |
| 1,124,730 | 8/1968 | Great Britain | 29/105 |

Primary Examiner—Harrison L. Hinson
Attorneys—John C. Evans, William S. Pettigrew and K. H. MacLean, Jr.

ABSTRACT: In preferred form, a hydraulic toolholder for retaining an elongated cutting tool in fixed relationship to the peripheral edge of a rotatable cylindrical metal billet for peeling a thin metal strip. The cutting tool is retained in recess in the body portion of the toolholder by a pivotal clamp member which is tightly drawn against the cutting tool by a cam-carrying wedge engaging a shaft interconnected with the clamp member. Hydraulic pressure alternately acting against opposite sides of a piston moves the interconnected wedge into and out of engagement with the shaft to clamp or unclamp the cutting tool.

PATENTED SEP 7 1971   3,603,186

INVENTORS
Charles W. Vigor &
BY Joseph A. Musial
J. C. Evans
ATTORNEY

INVENTORS
Charles W. Vigor &
BY Joseph A. Musial

J.C. Evans
ATTORNEY

INVENTORS
Charles W. Vigor &
BY Joseph A. Musial

J.C. Evans
ATTORNEY

PEELING MACHINE TOOL CLAMP

This invention relates to an improved tool clamp for retaining an elongated cutting tool in a fixed position.

A machine for peeling a thin metal strip from a cylindrical metal billet is disclosed in U.S. Ser. No. 485,001 filed Sept. 3, 1965, U.S. Pat. No. 3,460,366. The machine basically includes a drive motor, a headstock and gearbox, a spindle for mounting a cylindrical metal billet, a rigidly supported cutting tool and a windup mechanism for coiling the resultant strip of metal. The spindle-mounted cylindrical metal billet is rotated by the motor while the cutting tool or peeling knife shaves a thin strip of metal from its moving peripheral edge. Particular emphasis is placed on the necessity for maintaining a fixed, nonvibratory relationship between the rotating billet and the cutting tool. For this purpose a hydrostatic bearing supports the spindle to minimize vibration.

A method for peeling a thin metal strip from a rotating metal billet in accordance with the aforementioned machine is described in the U.S. Pat. No. 3,355,971 to Vigor issued Dec. 5, 1967 and entitled "Method of Producing Metal Strips." The surface velocity of the rotating billet and the tension applied to the peeled strip are critical factors in successful metal peeling. These factors are more thoroughly discussed in the aforesaid patent. Vibration detrimentally affects the strip quality producing an unsmooth and wavy chip or a fractured strip.

As previously explained, the billet is mounted for rotation on a rigidly supported spindle. To minimize vibrations, the cutting tool must also be rigidly supported in relationship to the billet. End-to-end misalignment or skewing of the elongated cutting tool with respect to the billet's axis of rotation must be prevented.

The toolholder disclosed in the aforementioned application and patent, adequately secures the elongated cutting tool in fixed relationship to the cylindrical billet. The cutting tool is held within a recessed channel in the body portion of the toolholder by an overlying clamp member which is fastened to the body portion by a plurality of machine screws. However, because the cutting tool must be resharpened frequently, considerable time and effort is expended in loosening the machine screws, removing the old cutting tool, inserting a new cutting tool, aligning the new cutting tool, and again tightening the machine screws. This time-consuming manner of tool change greatly reduces the efficiency of the aforementioned peeling machine. For example, in tests run with this toolholder, the time spent in tightening and loosening screws plus aligning the cutting tool was approximately 20 minutes. Since a copper billet could be peeled in 10 minutes and the tool was replaced every five billets, 28 percent of potential production time was spent in tool changes.

The subject hydraulically actuated toolholder substantially increases the efficiency of the aforementioned peeling machine by reducing the downtime occasioned by a tool change to a matter of seconds. Pistons are reciprocated in the toolholder by hydraulic pressure to move wedges having cam surfaces against a shaft. The resultant force on the shaft and on an interconnected clamp member causes movement of the latter toward the body of the toolholder and against the cutting tool. The cutting tool is quickly released from the toolholder by applying hydraulic pressure to an opposite side of the piston to disengage the wedges and the clamping shaft which loosens the clamp member. Upon insertion of a fresh cutting tool into the tool clamp, hydraulic pressure is again applied to force the wedges against the clamping shaft which causes the clamp member to press against the cutting tool.

Therefore, an object of the inventor is to provide an improved toolholder powered by hydraulic pressure which rigidly clamps a cutting tool between two relatively movable members and which members may be rapidly disengaged by the force of hydraulic pressure to release the cutting tool.

A still further object of the inventor is to provide an improved holder for cutting tools which utilizes hydraulic pressure to engage and clamp the tool and which is rapidly disengaged by the hydraulic pressure to release the tool.

A still further object of the inventor is to provide an improved holder for cutting tools which utilizes hydraulic pressure to engage and tightly clamp a cutting tool between two relatively movable members by moving a cammed wedge against a shaft which laterally draws an interconnected member toward the other member and against the cutting tool.

Further objects and advantages of the present invention will be apparent from the following description, reference being had to the accompanying drawings wherein the preferred embodiment of the present invention is clearly shown.

Figure 1:
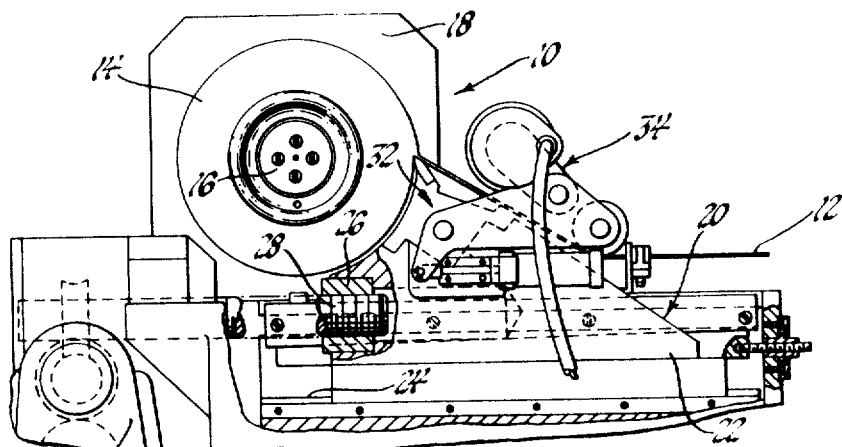
FIG. 1 is a partial vertical end view of the peeling machine with the cutting toolholder in operative position to peel a metal strip.

In FIG. 1 a machine 10 for peeling a thin metal strip 12 from a solid cylindrical billet 14 is partially illustrated. The billet 14 is mounted upon a spindle 16 which is rigidly supported for rotation by an externally pressurized, hydrostatically supported shaft (not visible) within a housing 18.

Figure 2:
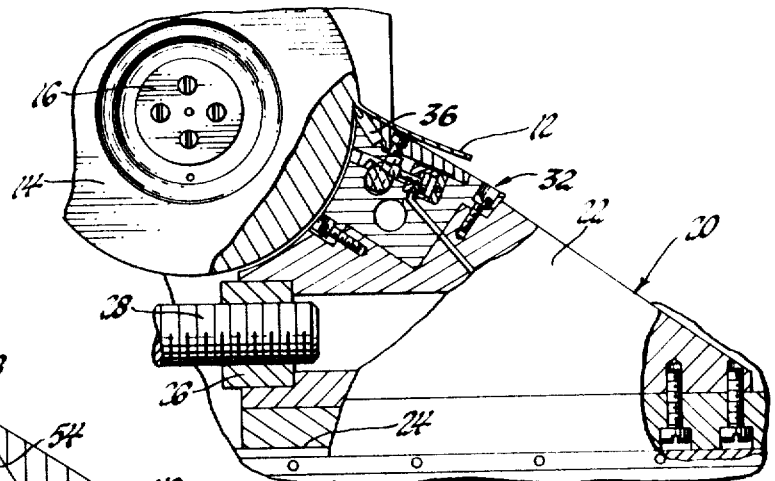
FIG. 2 is an enlarged view of the cutting toolholder and metal billet partially broken away and in section.

A cutting tool assembly 20 best shown in FIG. 2 has a frame 22 which is moved along ways 24 by nut 26 and a crossfeed screw 28. As revealed in FIG. 1, the crossfeed screw 28 is driven through a crossfeed gearbox 30 which derives its power from the same motor (not shown) that rotates spindle 16 and the billet 14. Frame 22 also supports a cutting toolholder 32 which is shown in section in FIG. 3. Also shown in FIG. 1 is a metal strip straightener assembly 34. For a more detailed explanation of the peeling machine and the method for peeling metal strips, reference is made to the aforesaid U.S. Ser. No. 485,001 and U.S. Pat. No. 3,355,971 respectively.

Figure 3:
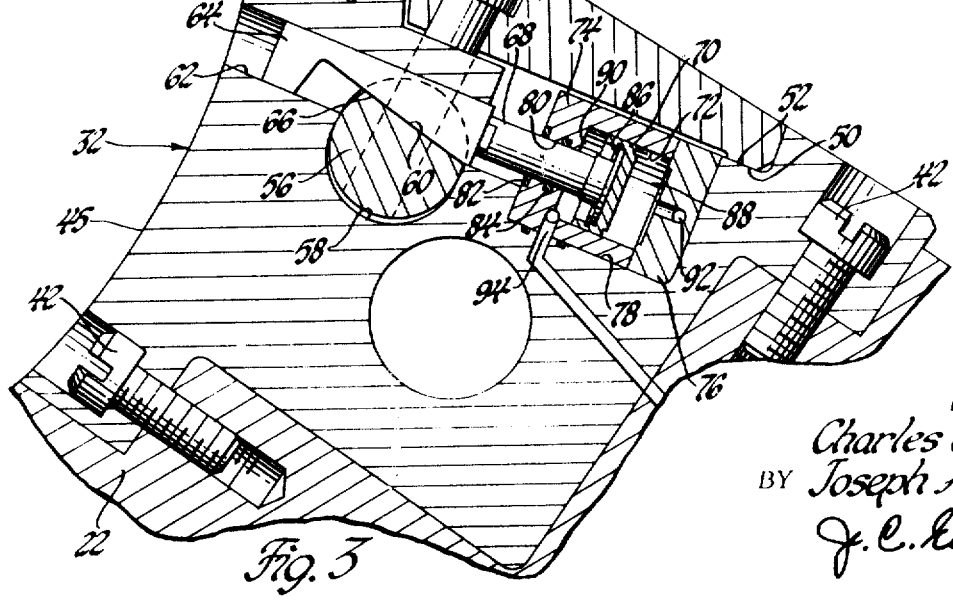
FIG. 3 is an enlarged sectional view of the cutting toolholder and cutting tool.
Figure 4:
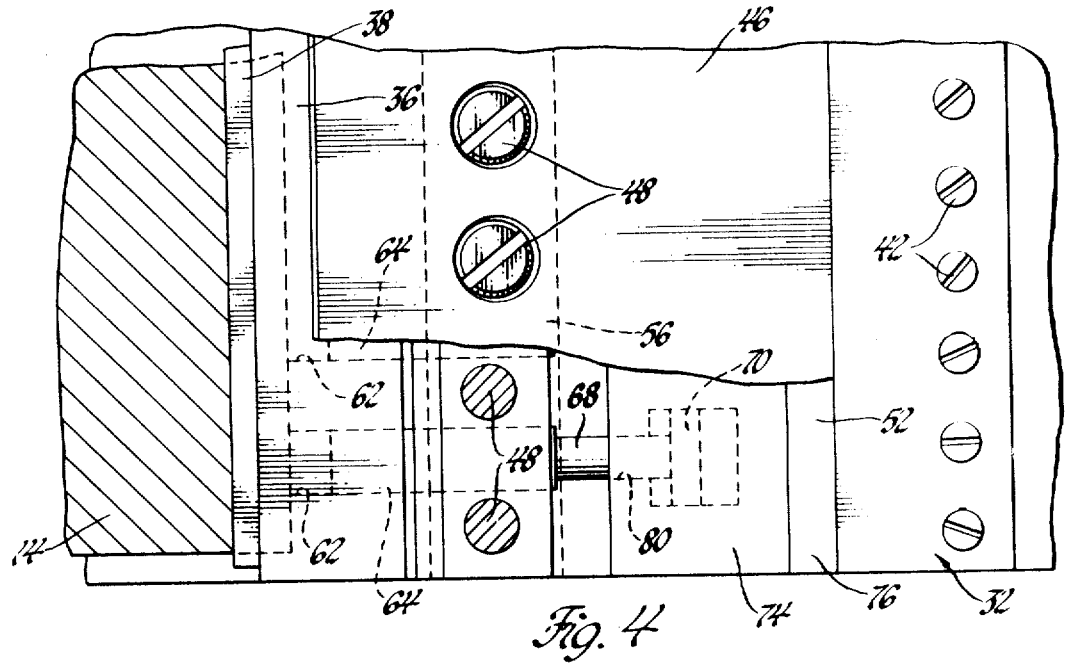
FIG. 4 is a horizontal top view of the metal billet and the cutting toolholder partially broken away and in section.

As more clearly shown in FIG. 3, an elongated cutting tool 36 includes a pointed insert 38 which is retained by brazing in a longitudinal slot 40 of the cutting tool 36. The insert 38 may be any suitable high-speed cutting tool material, such as tungsten carbide or tantanium carbide. The cutting tool 36 is supported by the toolholder 32 which is secured to the frame 22 by a plurality of machine screws 42. FIG. 4 shows the placement of screws 42 across the width of the toolholder. The number of screws 42 needed will depend upon the size of the toolholder and the rigidity required to withstand forces resulting from the cutting operation. Referring back to FIG. 3, it can be seen that the cutting tool 36 is placed in a recess 44 in the upper portion of the toolholder 32. The cutting tool insert 38 extends slightly beyond the curved front surface 45 of the toolholder 32 so that it may contact the rotating metal billet 14. The recessed portion 44 is formed at a desirable angle to orient the cutting tool 36 with respect to the rotating billet 14 for successful peeling.

A clamp 46 is secured to the toolholder 32 by screws 48 to rigidly secure the cutting tool 36 within the recess 44. The rear edge 50 of clamp 46 rests against a surface 52 on toolholder 32. The front edge 54 of the clamp 46 bears against the cutting tool 36 to hold the latter within the recessed portion 44.

The clamp 46 is pressed against the toolholder 32 and the cutting tool 36 by the application of force on the screws 48 which extend through the clamp member 46 and are threaded into a clamping bar or shaft 56. The clamping bar 56 extends across the width of the toolholder 32 as revealed in FIG. 4 and rests within an elliptical bore or channel 58. Bar 56 includes a flat bearing surface 60 which forms a plane inclined 15 degrees with respect to the axis of the pressure cylinders 72. A plurality of bores 62 extending normal to and intersecting bore 58 in the toolholder 32 house cylindrical wedges 64 which are reciprocal within the bores. The wedges 64 have cam surfaces 66 ground thereon which form a bearing surface inclined 15 degrees with respect to the axis of the wedge. The flat bearing surface 60 on bar 56 and the cam surfaces 66 coact to exert a downward force on the bar 56 and the innerconnected clamping member 46. In response to this downward force, the clamp 46 pivots about its rearward edge 50 and bears at its forward edge 54 against the cutting tool 36.

Each wedge 64 is connected to a piston 70 by a piston rod 68. The pistons 70 reciprocate within bores 72 in response to the application of hydraulic pressure forces alternately on opposite sides of the pistons. The bores 72 are formed within an elongated cylinder block 74 and a hydraulic cylinder head 76 held adjacent the cylinder block 74 covers the open ends of the bores 72. The cylinder block 74 and the cylinder head 76 are retained within a channel 78 in the tool holder 32 by screws (not shown).

Piston rod 68 extends through holes 80 in the cylinder block 74. Seals 82 and 84 within the block 74 encircle the piston rods to prevent leadage of hydraulic fluid therebetween. Pistons 70 are secured to the ends of piston rods 68 by retaining rings 86 which fit within grooves in the pistons 70. The pistons 70 divide the chambers formed by bores 72 into power chambers 88 and release chambers 90. An input passageway 92 connects the power chambers 88 with an external pressure source and interconnects the chambers. Another input passageway 94 connects the release chambers 90 with an external pressure source and interconnects the release chambers.

With reference to the FIGURES and the previous discussion, it can be understood that retention of the cutting tool 36 in recess 44 is accomplished by introducing relatively great hydraulic pressure through inlet 92 into the power chambers 88. This hydraulic pressure causes the piston rod 68 and wedges 64 to move toward the left in FIG. 3. Thereon the cam surfaces 66 coact with the bearing surface 60 on the clamping bar 56 to exert a downward clamping force on screws 48 and clamp member 46. This downward force on the clamp 46 pivots it about its rearward edge 50 against surface 52 on tool holder 32 and presses the clamp's forward edge 54 against the cutting tool 36.

Release of the cutting tool 36 from the toolholder is accomplished by depressurizing the power chambers 88 and routing hydraulic pressure to the release chamber 90 through the inlet 94. Hydraulic pressure in the release chambers 90 moves the piston rods 68 and connected wedges 64 to the right in FIG. 3 and allows the clamping bar 56 and interconnected clamp 46 to release the cutting tool 36.

Figure 5:
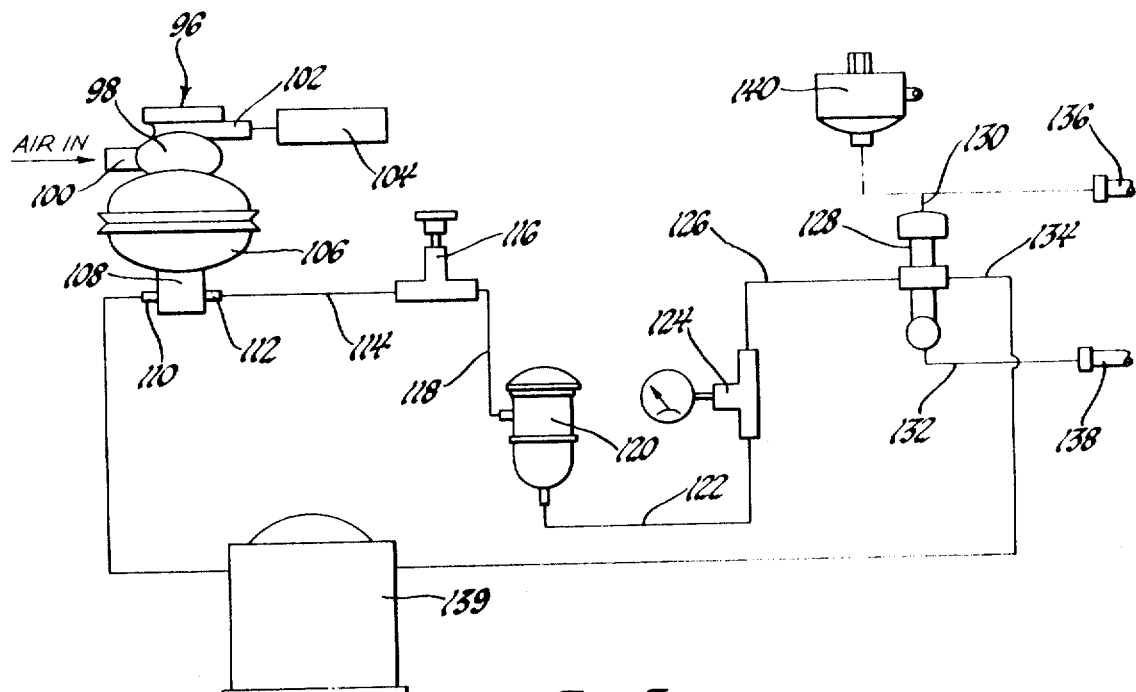
FIG. 5 is a schematic drawing of the hydraulic control system for the cutting toolholder.

FIG. 5 is a schematic diagram showing the hydraulic pressure system for the tool-clamping arrangement. A pump is shown generally at 96 and is of the air-to-oil intensifier type in which a large diameter pressurized air-driven piston or diaphragm is mechanically coupled to a smaller diameter hydraulic piston to achieve relatively great hydraulic pressure. Pump 96 receives pressurized air into a valving portion 98 through an intake 100 from which the pressurized air is directed against the large diameter air piston or diaphragm. This moves the diaphragm alternately in an upward and downward direction. The air is subsequently exhausted through an outlet 102 and a muffler 104. The portion 108 of the pump 96 contains a small diameter piston which is connected to the air-driven diaphragm for pressurizing hydraulic fluid drawn into inlet 110 and discharged from outlet 112. The particular pump used with the working embodiment of the present invention has an air piston area to oil piston area ratio of 150:1 which results in 100 p.s.i. of air pressure producing 15,000 p.s.i. of hydraulic pressure. Although this type of pump produces a sufficiently great hydraulic pressure, the volume of fluid pumped is inherently small which precludes its sue in some applications. Because only a relatively small fluid flow is required to open and to close the toolholder and only static pressure is required to maintain the toolholder closed, the aforementioned air to oil intensifier pump has proved highly satisfactory.

Fluid flows under pressure from the outlet 112 of pump 96 through a hydraulic hose 114 to a needle valve 116 which regulates fluid flow through the circuit. From needle valve 116 high-pressure fluid flows through a hose 118, a filter 120, a hose 122, a pressure gauge 124 and a hose 126 into an electrically actuated two-position hydraulic valve 128. Valve 128 has three outlets 130, 132 and 134. Outlet 130 is connected to the power chambers 88 by hydraulic hose 136 and input passageway 92. Outlet 132 is connected to the release chambers 90 by a hydraulic hose 138 and input passageway 94. Outlet 134 discharges directly to a storage tank 139. Storage tank 139 in turn is connected to the inlet 110 of pump 96.

A solenoid actuator 140 is illustrated in FIG. 5 to control the two-position valve 128. The positions of the actuator 140 correspond to the clamping mode of operation and the unclamping mode of operation. When the actuator 140 is in the clamp position, valve 128 is controlled to apply fluid pressure through outlet 130, hose 136 and input 92 to the power chamber 88. In its unclamp position, actuator 140 controls valve 128 to relieve power chamber 88 of hydraulic pressure and apply pressure to the release chamber 90.

Figure 6:
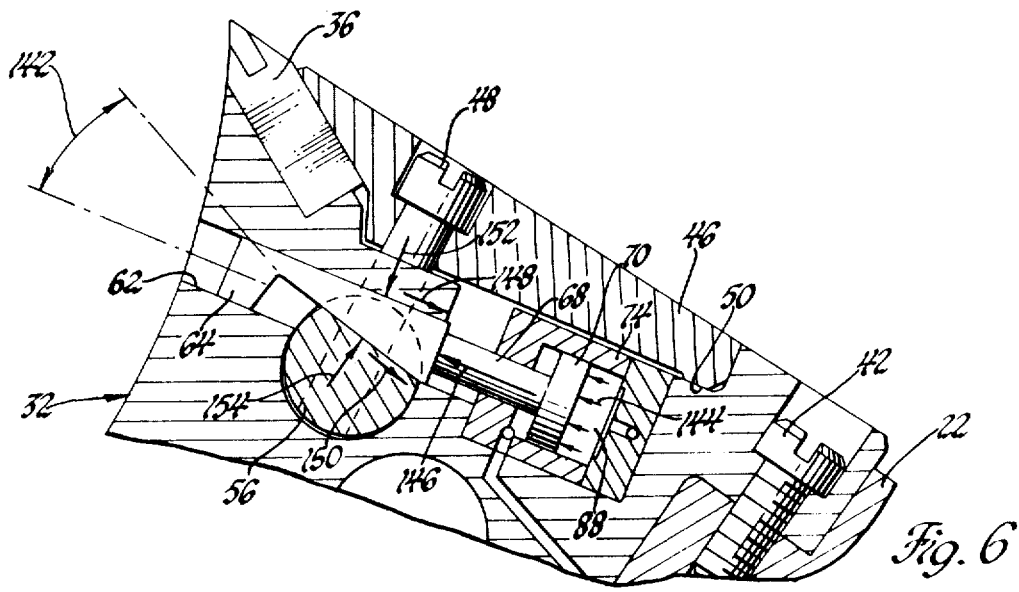
FIG. 6 is a view of the toolholder similar to FIG. 3 with force vectors acting on one of the wedges during the clamping mode of operation.

In a working embodiment of the peeling machine and hydraulic toolholder, it was found that a pressure of 8,000 p.s.i. produced a satisfactory clamping force on the cutting tool 36. FIG. 6 illustrates a view of the toolholder showing force vectors acting on one of the wedges. Pressure forces 144 within power chamber 88 caused by the hydraulic pressure of 8,000 p.s.i. act against piston 70 to produce an axial force 146 upon piston rod 68 and wedge 64. Resultant frictional forces 148 and 150 between the wedge 64 and bore 62 and between the wedge and the clamping bar are 2,540 pounds and 2,740 pounds respectively. A downwardly directed force 152 between wedge 154 and a toolholder 32 is 16,800 pounds. An upwardly directing force 154 between clamping bar 56 and wedge 54 is 18,200 pounds.

Figure 7:
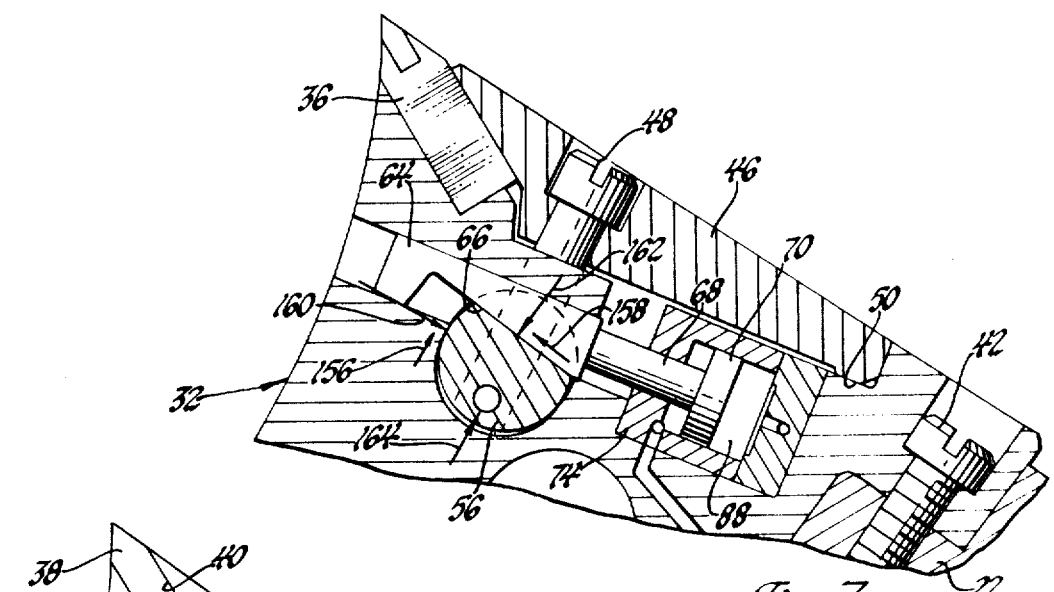
FIG. 7 is a view of the toolholder with force vectors acting on the clamping shaft and tool clamp.
Figure 8:
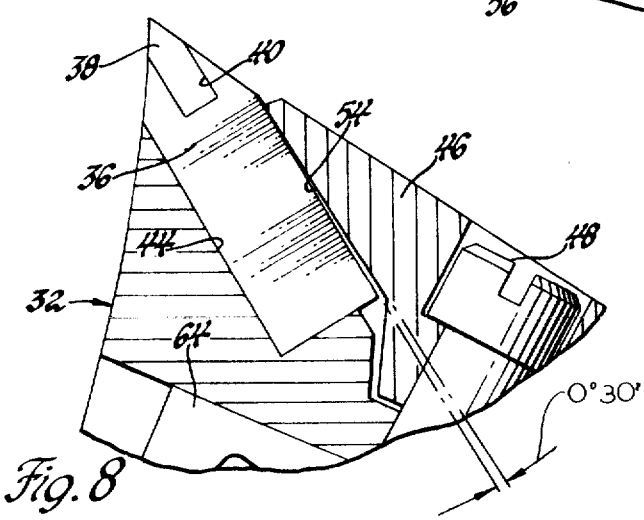
FIG. 8 is a partial side view of the toolholder in the unclamped mode of operation with the tool clamp unstressed.

Referring now to FIG. 7, a vector diagram of forces acting on the clamping bar 56 and the clamp 46 is illustrated. A frictional force 156 of 900 pounds acts against downward movement of the clamping bar 56. A frictional force 158 of 2,740 pounds is incurred between cam surface 66 and the clamping bar 56. A force 160 of 5,900 pounds is exerted by toolholder 32 against the clamping bar 56. A downwardly directed force 162 bears normally against bearing surface 60 of the clamping bar 56. A resultant force 164 of 16,400 pounds on the clamping bar 56 pivots the clamp 46 about edge 50 against the cutting tool 36.

It has been found that the most effective clamping action is achieved by concentrating the load exerted by clamp 46 as closely as possible to the tip of the clamp. To allow for deflection of the edge 54 and still maintain the loading as near the tip as possible, the clamp is constructed with an angle of 30 minutes between the top plane of the cutting tool 36 and the forward edge 54 of the clamp when the clamp 46 is in a free, unstrained condition. Upon tightening, the edge 54 of the clamp deflects until both surfaces are in full contact.

While the embodiment of the present invention as herein described constitutes a preferred form, it is to be understood that other forms may be adapted.

What is claimed is as follows:

1. A hydraulic pressure actuated toolholder for rigidly retaining an elongated cutting tool in fixed relationship to a rotating cylindrical metal billet for peeling a thin metal strip from the billet comprising: a body portion mounted adjacent the cylindrical surface of the billet; said body portion including a bore substantially aligned with the billet's axis of rotation; a shaft within said bore having a flat bearing surface; said body portion including a plurality of holes intersecting said bore; wedges within said holes having cam surfaces adapted to contact said bearing surface of the shaft when said wedges are axially moved in said holes for applying a radial force on said shaft; an elongated tool clamp operably connected to said shaft and resting against said body portion and against the cutting tool; hydraulic pressure means operably connected to said wedges for moving said wedges in said holes and whereby movement of the wedges in one direction produces a resultant force on said shaft and connected tool clamp to clamp the cutting tool between said tool clamp and said body portion and movement in the other direction releases the cutting tool.

2. A hydraulic pressure actuated toolholder for rigidly retaining an elongated cutting tool in fixed relationship to a rotating cylindrical metal billet for peeling a thin metal strip from the billet comprising: a body portion mounted adjacent the cylindrical surface of the billet; said body portion including a bore substantially aligned with the billet's axis of rotation; a shaft within said bore having a flat bearing surface; said body portion including a plurality of holes intersecting said bore; wedges within said holes having cam surfaces adapted to contact said bearing surface of the shaft when said wedges are axially moved in said holes for applying a radial force on said shaft; said body portion having a recessed channel adapted to support and align the cutting tool with respect to the billet's axis of rotation; an elongated tool clamp operably connected to said shaft and resting against said body portion and against the cutting tool; hydraulic pressure means operably connected to said wedges for moving said wedges in said holes and whereby movement of the wedges in one direction produces a resultant force on said shaft and connected tool clamp to clamp the cutting tool between said tool clamp and said body portion and movement in the other direction releases the cutting tool.

3. A hydraulic pressure actuated toolholder for rigidly retaining an elongated cutting tool in fixed relationship to a rotating cylindrical metal billet for peeling a thin metal strip from the billet comprising: a body portion mounted adjacent the cylindrical surface of the billet; said body portion including a bore substantially aligned with the billet's axis of rotation; a shaft within said bore having a flat bearing surface; said body portion including a plurality of holes intersecting said bore; wedges within said holes having cam surfaces adapted to contact said bearing surface of the shaft when said wedges are axially moved in said holes for applying a radial force on said shaft; an elongated tool clamp operably connected to said shaft and resting against said body portion and against the cutting tool; means operably connected to said wedges for moving said wedges in said holes and whereby movement of the wedges in one direction produces a resultant force on said shaft and connected tool clamp to clamp the cutting tool between said tool clamp and said body portion and movement in the other direction releases the cutting tool.

4. A hydraulic pressure actuated toolholder for rigidly retaining an elongated cutting tool in fixed relationship to a rotating cylindrical metal billet for peeling a thin metal strip from the billet comprising: a body portion mounted adjacent the cylindrical surface of the billet; said body portion including a bore substantially aligned with the billet's axis of rotation; a shaft within said bore having a flat bearing surface; said body portion including a plurality of holes intersecting said bore; wedges within said holes having cam surfaces adapted to contact said bearing surface of the shaft when said wedges are axially moved in one direction in said holes; an elongated tool clamp operably connected to said shaft and having one edge resting against said body portion and an opposite edge resting against the cutting tool; hydraulic pressure means operably connected to said wedges for moving said wedges in said holes and whereby movement of said wedges in one direction slides said cam surfaces against said bearing surface which produces a force on said shaft and connected tool clamp to clamp the cutting tool between said tool clamp and said body portion and whereby movement of said wedges in the opposite direction disengages said cam surfaces and said bearing surface which relieves the force on said shaft and connected tool clamp thereby unclamping the cutting tool from between said tool clamp and said body portion.